US008798552B2

(12) United States Patent
Brobston et al.

(10) Patent No.: US 8,798,552 B2
(45) Date of Patent: Aug. 5, 2014

(54) RECONFIGURABLE WIRELESS TRANSCEIVER

(75) Inventors: Michael Brobston, Allen, TX (US); Seong Eun Kim, Plano, TX (US); Lup Meng Loh, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 850 days.

(21) Appl. No.: 11/466,304

(22) Filed: Aug. 22, 2006

(65) Prior Publication Data

US 2008/0051134 A1 Feb. 28, 2008

(51) Int. Cl.
H04B 1/38 (2006.01)

(52) U.S. Cl.
USPC .............................. 455/73; 455/132; 455/134

(58) Field of Classification Search
USPC ............. 455/132, 133, 134, 135, 66.1, 67.11, 455/550.1
See application file for complete search history.

(56) References Cited

U.S. PATENT DOCUMENTS

| 5,771,468 | A  | * | 6/1998  | Stein            | 455/561   |
|-----------|----|---|---------|------------------|-----------|
| 6,522,877 | B1 | * | 2/2003  | Lietsalmi et al. | 455/422.1 |
| 6,665,521 | B1 | * | 12/2003 | Gorday et al.    | 455/67.11 |
| 7,400,872 | B2 | * | 7/2008  | Kogure           | 455/277.2 |
| 7,493,141 | B2 | * | 2/2009  | Brobston et al.  | 455/552.1 |
| 2003/0099215 | A1 | * | 5/2003 | O'Shea          | 370/331   |
| 2004/0142723 | A1 | * | 7/2004 | Shippee         | 455/552.1 |
| 2004/0166823 | A1 | * | 8/2004 | Alderton        | 455/250.1 |
| 2005/0202842 | A1 | * | 9/2005 | Brobston et al. | 455/552.1 |
| 2005/0227728 | A1 | * | 10/2005 | Trachewsky et al. | 455/552.1 |
| 2006/0046716 | A1 | * | 3/2006 | Hofstaedter et al. | 455/432.2 |
| 2006/0099952 | A1 | * | 5/2006 | Prehofer        | 455/440   |
| 2007/0026827 | A1 | * | 2/2007 | Miyano et al.   | 455/132   |

* cited by examiner

Primary Examiner — Zhiyu Lu

(57) ABSTRACT

A reconfigurable wireless transceiver and method of use are disclosed. As one example, a reconfigurable wireless transceiver is disclosed, which includes a transmitter unit, a plurality of receiver units, and a processing unit coupled to the plurality of receiver units. A first receiver unit of the plurality of receiver units receives a first signal at a first frequency, and determines a strength level of the first signal. A second receiver unit of the plurality of receiver units searches for a second signal at a second frequency, detects the second signal at the second frequency, and determines a strength level of the detected second signal. The processing unit determines if the strength level of the detected second signal is greater than a predetermined value, and enables the second receiver unit to receive a third signal at substantially the second frequency, if the strength level of the detected second signal is greater than the predetermined value. The predetermined value may be substantially equal to the signal strength of the received first signal, and the third signal may be associated with over-the-air programming or tasking. As a second example, a method for reconfiguring a wireless transceiver is disclosed, which includes receiving a first signal in a first frequency band, determining a signal strength of the received signal, searching for a second signal in a second frequency band, detecting the second signal, determining a signal strength of the detected second signal, comparing the signal strength of the received first signal with a predetermined signal strength value, and enabling reception of the detected second signal and disabling reception of the first signal, if the signal strength of the detected second signal is greater than the predetermined signal strength value.

22 Claims, 3 Drawing Sheets

RECONFIGURABLE WIRELESS TRANSCEIVER

FIELD OF THE INVENTION

The invention is related to the wireless communication field, and more particularly, but not exclusively, to a reconfigurable wireless transceiver and method of use.

BACKGROUND OF THE INVENTION

Communication system designers consider existing wireless transceivers not readily reconfigurable. Specifically, although many wireless transceivers include multiple receivers, the transceivers' designs do not support dynamic over-the-air programming or tasking. In other words, today's wireless transceivers are not reconfigurable "on the fly". Instead, existing wireless transceivers use dedicated receive channels to execute over-the-air programs or tasks, and do not support concurrent over-the-air programming while the other receiver is in operation. Traditionally, in order to reconfigure a receiver, a higher number of modem interactions and/or the use of shadow registers are needed, which increases die area and power consumption.

Commonly, wireless transceivers use additional data storage elements (e.g., shadow registers, additional memory, etc.) to pre-store reconfiguration settings, in an attempt to reduce receive channel reconfiguration time. However, this method of reducing reconfiguration time is more than outweighed by the additional costs incurred (e.g., increased IC die area, power consumption, etc.). Also, some wireless transceivers include multiple receivers for diversity reception, in order to minimize fading effects and improve the capacity of the radio link. However, these multiple receivers typically share a common synthesizer. Consequently, the receivers are incapable of dynamically searching bands and modes independently from one another, in order to execute over-the-air programs tasks for reconfiguration as described.

SUMMARY OF THE INVENTION

The present invention provides a reconfigurable wireless transceiver and method of use. In one example embodiment, a reconfigurable wireless transceiver is provided, which includes a transmitter unit, a plurality of receiver units, and a processing unit coupled to the plurality of receiver units. A first receiver unit of the plurality of receiver units receives a first signal at a first frequency, and determines a strength level of the first signal. A second receiver unit of the plurality of receiver units searches for a second signal at a second frequency, detects the second signal at the second frequency, and determines a strength level of the detected second signal. The processing unit determines if the strength level of the detected second signal is greater than a predetermined value, and enables the second receiver unit to receive a third signal at substantially the second frequency, if the strength level of the detected second signal is greater than the predetermined value. The predetermined value may be substantially equal to the signal strength of the received first signal, and the third signal may be associated with over-the-air programming or tasking.

In a second example embodiment, a reconfigurable receiver for a wireless transceiver is provided, which includes a first programmable receive channel, a first signal strength indicator coupled to the first programmable receive channel, a second programmable receive channel, a second signal strength indicator coupled to the second programmable receive channel, and a digital processing unit coupled to the first programmable receive channel, first signal strength indicator, second programmable receive channel, and second signal strength indicator. The digital processing unit is adapted to program the first programmable receive channel to receive a first signal at a first frequency, program the second programmable channel to search for a second signal at a second frequency, receive from the first signal strength indicator, a first value associated with a signal strength of the received first signal, receive from the second signal strength indicator, a second value associated with a signal strength of a detected second signal, compare the second value with a predetermined value, and if the second value is greater than the predetermined value, program the second programmable receive channel to receive a third signal at the second frequency.

In a third example embodiment, a method for reconfiguring a wireless transceiver is provided, which includes the steps of receiving a first signal in a first frequency band, determining a signal strength of the received signal, searching for a second signal in a second frequency band, detecting the second signal, determining a signal strength of the detected second signal, comparing the signal strength of the received second signal with a predetermined signal strength value, and enabling reception of the detected second signal, if the signal strength of the detected second signal is greater than the predetermined signal strength value.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Example embodiments of a reconfigurable wireless transceiver and method of use are described. In one example embodiment, the wireless transceiver includes a plurality of programmable receive channels. A secondary receive channel is programmed to execute a search across different frequency bands and modes for a signal having a higher strength than the signal being processed by a primary receive channel. If the secondary receive channel detects such a higher strength signal, the configuration of the secondary channel is locked in, the mode associated with that signal is identified, and the identity of that mode is confirmed. Consequently, the wireless transceiver can reconfigure the secondary receive channel off-line and prepare it to receive over-the-air programming or tasking signals, without disrupting the reception of the signal being processed in the primary receive channel. Consequently, a reconfigurable wireless transceiver is described, which significantly minimizes receiver reconfiguration time and hardware costs (e.g., die area, package size and weight, power consumption, etc.) in comparison with prior wireless transceivers.

Figure 1:
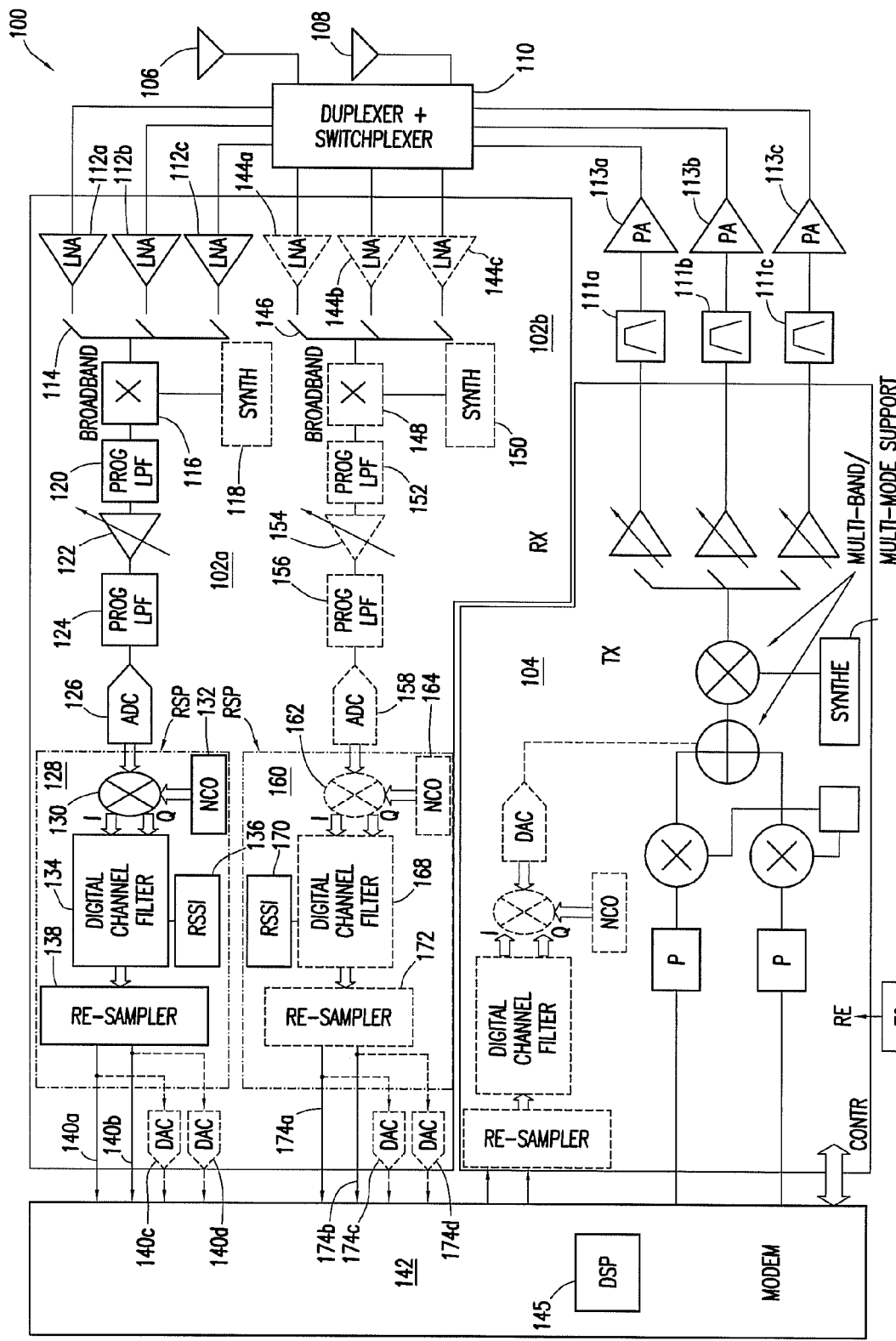
FIG. 1 depicts a schematic block diagram of a reconfigurable wireless transceiver, which can be used to implement an example embodiment of the present invention.

With reference now to the figures, FIG. 1 depicts a schematic block diagram of a reconfigurable wireless transceiver 100, which can be used to implement an example embodiment of the present invention. For this example embodiment, wireless transceiver 100 represents a cellular phone, with a number of its components located within a Radio Frequency IC (RFIC). However, it should be understood that this example embodiment is provided for illustrative purposes only. In a different embodiment, wireless transceiver 100 may be implemented with, for example, a mobile radiotelephone, wireless handset, mobile station (MS), or any other suitable type of wireless communication device that can transmit and receive voice signals, video signals, and/or analog or digital data. Also, in a different embodiment, wireless transceiver 100 may be implemented without an RFIC.

Referring to FIG. 1, wireless transceiver 100 includes a receiver section generally designated by reference numeral 102, and a transmitter section generally designated by reference numeral 104. Receiver section 102 and transmitter section 104 are located within an RFIC. Outside of the RFIC, wireless transceiver 100 includes two transmit/receive antennas 106 and 108 connected to a duplexer/switchplexer unit 110. The switch portion of duplexer/switchplexer unit 110 can select one of the antennas 106, 108 to receive and transmit RF signals, and the duplexer portion of unit 110 enables the selected antenna 106 or 108 to transmit and receive.

Notably, receiver section 102 includes two programmable receive channels generally designated by reference numerals 102a, 102b. For this example embodiment, each receive channel 102a, 102b can receive RF signals within three frequency bands. In receive channel 102a, the received RF signals from each band are coupled from an antenna (e.g., antenna 106) to an input of a respective low noise amplifier (LNA) 112a-112c. Each LNA 112a-112c amplifies the received RF signals from the selected antenna and produces an amplified RF signal. The outputs of the three LNAs 112a-112c are connected to respective inputs of a multiplexer/switch unit 114, which selects signals for reception from one or more frequency bands by coupling the amplified RF signals from one of the LNAs 112a-112c to a down-converter 116. In a different embodiment, the multiplexer/switch unit 114 can be implemented as multiple buffers/transconductance gain amplifiers of the down-converter 116, with one for each LNA output. A synthesizer 118, which functions as a local oscillator to provide the down-conversion frequency, is connected to the down-converter 116.

Notably, for this example embodiment, the down-converter 116 converts the received RF signal to an IF signal. However, in a different embodiment, the down-converter 116 may convert the RF signal directly to a baseband signal (e.g., IF=0). Also, for this example embodiment, the multiplexer/switch unit 114 is programmed to select only one of the three frequency bands for reception and down-conversion. In any event, the specific number of signals in different frequency bands that can be received individually or a combination in a handover scenario, and the extent of the receiver down-conversion, are simply design choices and not intended to limit the scope of coverage of the present invention.

The IF (or baseband) signal at the output of down-converter 116 is filtered to reduce interference by a programmable low-pass filter 120, amplified by a variable gain amplifier 122, and filtered again by a second programmable low-pass filter 124. The filtered analog signal is then converted to a digital signal by an analog-to-digital (A/D) converter 126. The digitized IF signal at the output of A/D converter 126 is coupled to the input of a digital down-converter 130, which is a component of a Radio Signal Processing (RSP) unit generally designated by reference numeral 128. Notably, in a different embodiment, if the signal at the output of down-converter 116 is a baseband signal instead of an IF signal, the digital down-converter stage may be bypassed. In that case, the digital baseband signal from A/D converter 126 may be coupled directly to a digital channel filter 134, which is another component of RSP unlit 128.

For this example embodiment, the digital IF signal from A/D converter 126 is coupled to digital down-converter 130. A numerically-controlled oscillator (NCO) 132 in RSP unit 128 is connected to digital down-converter 130, which brings the digital IF signal to baseband signal components. The baseband signals are filtered by digital channel filter 134 in RSP unit 128 to remove interference and spurious signals. The filtered baseband signals are coupled to a re-sampler unit 138, which serves as an interface between RSP unit 128 and a modem 142 by providing a correct sampling rate for the baseband signals. The modem 142, which is located outside of the RFIC, is typically a custom-made device that includes a Digital Signal Processor (DSP) 145. The modem 142 and DSP 145 are designed to support concurrent operations and the processing of different signals in the two receive channels 102a and 102b, and the modem 142 can change the operating mode of the DSP 145 in response to suitable control instructions from the RSP 128 (e.g., conveyed via control link 143). The digital baseband signal samples are output to modem 142 via data links 140a and 140b. For added modem interface flexibility, these signal samples are also converted to analog signals by two digital-to-analog (D/A) converters 140c and 140d and output to modem 142.

Notably, RSP unit 128 also includes a Receive Signal Strength Indicator (RSSI) unit 136 coupled to the digital channel filter 134. For this example embodiment, the RSSI unit 136 measures the magnitude of the received signal (e.g., magnitude indicated by a voltage level of the baseband signal in the digital channel), and associates the measured voltage level with a corresponding power level (e.g., in dBm). In other words, the RSSI unit 136 monitors the power or strength of the signal in the band being received by receiver section 102a. The signal strength values indicated by RSSI unit 136 are used by RSP unit 128 for subsequent signal processing purposes. In a different embodiment, the signal strength values indicated by RSSI unit 136 may be coupled to a modem for processing by a DSP (e.g., as described below).

In the second receive channel 102b, the received RF signals from each band are coupled from an antenna (e.g., antenna 108) to an input of a respective LNA 144a-144c. Each LNA 144a-144c amplifies the received RF signals from the antenna and produces an amplified RF signal. The outputs of the three LNAs 144a-144c are connected to respective inputs of a multiplexer/switch unit 146, which is programmed to select signals for reception by coupling the amplified RF signals from one of the LNAs 144a-144c to a down-converter 148. Various embodiments of the multiplexer/switch unit 146 are described above. A synthesizer 150, which functions as a local oscillator to provide the down-conversion frequency, is connected to the down-converter 116.

Again, for this example embodiment, the down-converter 148 converts the received RF signal to an IF signal. However, in a different embodiment, the down-converter 148 may convert the RF signal directly to a baseband signal. Also, the multiplexer/switch unit 146 is programmed to select one of the three frequency bands for reception and down-conversion. However, similar to receive channel 102a, the specific number of signals from different frequency bands that can be received individually or in combination for handover by receive channel 102b, and the extent of the receiver down-conversion, are simply design choices and not intended to limit the scope of coverage of the present invention.

The IF (or baseband) signal at the output of down-converter 148 is filtered to reduce interference by a programmable low-pass filter 152, amplified by a variable gain amplifier 154, and filtered again by a second programmable low-pass filter 156. The filtered analog signal is then converted to a digital signal by an A/D converter 158. The digitized IF signal at the output of A/D converter 158 is coupled to the input of a digital down-converter 162, which is a component of a second RSP unit generally designated by reference numeral 160. Similar to receive channel 102a, if the signal at the output of down-converter 162 in receive channel 102b is a baseband signal instead of an IF signal, the digital down-converter stage may be bypassed. In that case, the digital baseband signal from A/D converter 158 may be coupled directly to a second digital channel filter 168, which is another component of second RSP unit 160.

For this example embodiment, the digital IF signal from A/D converter 158 is coupled to digital down-converter 162. An NCO 164 in second RSP unit 160 is connected to digital down-converter 162, which down-converts the digital IF signal to baseband signal components. The baseband signals are filtered by digital channel filter 168 in second RSP unit 160 to remove interference and spurious signals. The filtered baseband signals are coupled to a re-sampler unit 172, which serves as an interface between second RSP unit 160 and modem 142 by providing the correct sampling rate for the baseband signals. The digital baseband signal samples are output from the second receive channel 102b to modem 142 by data links 174a and 174b. For added modem interface flexibility, these signal samples are also converted to analog signals by two D/A converters 174c and 174d and output to modem 142.

Notably, second RSP unit 160 also includes a second RSSI unit 170 coupled to the digital channel filter 168. For this example embodiment, the second RSSI unit 170 measures the magnitude of the received signal in the second receive channel 102b, and associates the measured voltage level with a corresponding power level (e.g., in dBm). In this case, the second RSSI unit 170 monitors the strength of the signal in the band being received by receiver section 102b. The signal strength values indicated by RSSI unit 170 are used by RSP unit 160 for subsequent signal processing purposes. In a different embodiment, the signal strength values indicated by RSSI unit 170 may be coupled to DSP 145 in modem 142, and modem 142 can change the operating mode of DSP 145 in response to suitable control instructions from RSP 160 (e.g., conveyed via control link 143). In yet another embodiment, a digital processor (not shown) may be included in receiver section 102 to monitor the secondary RSSI 170, and compare the signal strength with a predetermined value as the secondary receive channel 102b is searching the frequency bands. In this case, the processor located in the receiver section can convey suitable control instructions to modem 142 (e.g., via control link 143), in order to change the operating mode for DSP 145.

In operation, referring to the example embodiment in FIG. 1 for illustrative purposes, assume that one of the two receive channels 102a, 102b is a primary receive channel, and the second receive channel is a secondary receive channel. As described earlier, the primary and secondary receive channels (e.g., 102a, 102b) can operate concurrently in different modes, and also receive signals concurrently in different frequency bands. For example, the primary receive channel (e.g., receive channel 102a) may be actively communicating (or, for example, "idle") and operating at 2.1 GHz in a Wideband Code Division Multiple Access (WCDMA) mode. The secondary receive channel (e.g., receive channel 102b) may be programmed to operate, for example, in an "idle" mode and enabled to operate at any suitable frequency in the European Global System for Mobile Communications (GSM) and Digital Cellular System (DCS) communication modes. While the primary receive channel is active, the secondary receive channel's RSP unit (e.g., RSP unit 160) monitors the receive signal strength values from the associated RSSI unit (e.g., RSSI unit 170), and executes a suitable algorithm that causes the secondary receive channel (e.g., 102b) to search frequency bands (and modes) other than the band (and/or mode) of the signal being processed by the primary receive channel (e.g., 102a).

Essentially, the secondary receive channel's RSP unit executes a suitable algorithm that causes that channel to search across each frequency band for a received signal having a higher signal strength than that of the received signal being processed through the primary receive channel (e.g., as indicated by a predetermined value). If the secondary receive channel's RSP unit detects a received signal having a signal strength higher than that of the predetermined value, then the secondary receive channel's RSP unit executes a suitable algorithm to determine the communication mode associated with that higher strength signal and its frequency (e.g., by determining the bandwidth and frequency, respectively, of the higher strength signal), and sends the probable identity of that mode in a suitable control message to the DSP (e.g., DSP 145) in the transceiver's modem (e.g., modem 142). If the DSP in the modem determines that the detected communication mode is an acceptable mode (e.g., by confirming the identity of the mode in a received pilot signal), the DSP can instruct the RSP unit in the secondary receive channel to lock in the reconfiguration of the receiver section 102, and the secondary receive channel can be readied to receive and execute one or more over-the-air programs or tasks, while the primary receive channel is still configured to receive signals in a different frequency band and/or mode.

Figure 2:
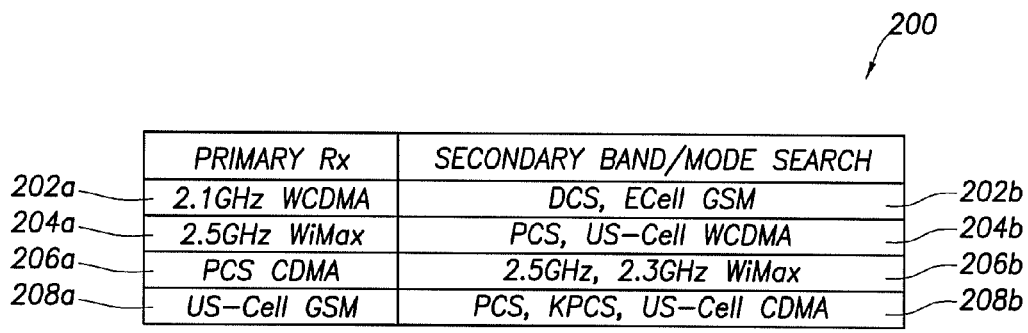
FIG. 2 depicts a simplified diagram, which illustrates how a secondary receive channel of the wireless transceiver shown in FIG. 1 can be used to implement a frequency band/mode search algorithm, in accordance with one or more example embodiments of the present invention.

FIG. 2 depicts a simplified diagram 200, which illustrates how a secondary receive channel of wireless transceiver 100 shown in FIG. 1 can be used to implement a frequency band/mode search algorithm, in accordance with one or more example embodiments of the present invention. As shown, in one example embodiment, the primary receive channel may be operating at 2.1 GHz in a WCDMA mode (202a), and the secondary channel may be searching for signals in suitable frequency bands in the DCS and European cellular GSM modes (202b). In a second example embodiment, the primary receive channel may be operating at 2.5 GHz in a WiMax mode (204a), and the secondary channel may be searching for signals in suitable frequency bands in the Personal Communications Services (PCS) and U.S. cellular WCDMA modes (204b). In a third example embodiment, the primary receive channel may be operating in the PCS CDMA mode (206a), and the secondary channel may be searching for signals at 2.5 GHz and 2.3 GHz in a WiMax mode (206b). In a fourth example embodiment, the primary receive channel may be operating in the U.S. cellular GSM mode (208a), and the secondary channel may be searching suitable frequency bands in the PCS, Korean PCS, and U.S. cellular CDMA modes (208b).

Figure 3:
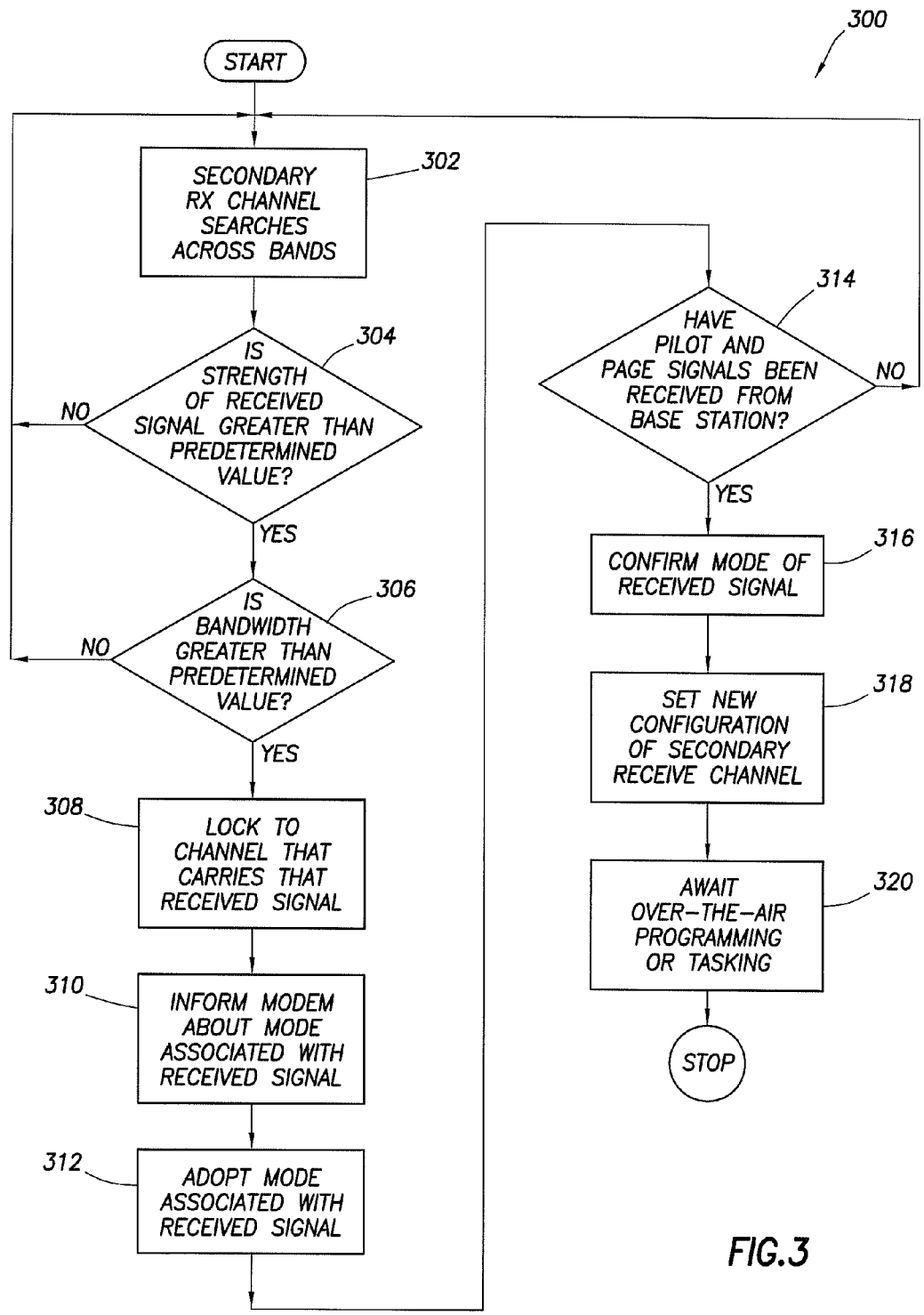
FIG. 3 is a flowchart depicting a method for reconfiguring a wireless transceiver, which can be used to implement an example embodiment of the present invention.

FIG. 3 is a flowchart depicting a method 300 for reconfiguring a wireless transceiver, which can be used to implement an example embodiment of the present invention. Referring to FIG. 3 and the illustrative embodiment shown in FIG. 2, the RSP (e.g., RSP 160) in the secondary or "off-line" receive channel (e.g., receive channel 102b) executes a suitable algorithm that causes the programmable secondary receive channel to select suitable modes and search for signals across a plurality of frequency bands (step 302). For example, the secondary receive channel may search for signals in the 2.1 GHz WCDMA band, 1.9 GHz PCS band, 1.8 GHz DCS band, 1.8 GHz KPCS band, 900 MHz European cellular band, and the 800 MHz U.S. cellular band. If the RSP of the secondary receive channel determines that a signal has been detected in one of the searched bands, that RSP monitors the associated RSSI unit (e.g., RSSI unit 170) to determine if the strength level (e.g., power level) of the signal received in the secondary receive channel is greater than a predetermined value (step 304). For example, the secondary RSP may determine if the strength level of the signal detected in the secondary receive channel is greater than that of the signal being monitored by the RSP (e.g., RSP 128) in the primary or "on-line" receive channel. As an alternative, for example, the secondary RSP may determine if the strength level of the signal detected in the secondary receive channel is greater than or equal to a specific pre-selected value. If (at step 304) the strength level of the signal detected in the secondary receive channel is not greater than or equal to the predetermined value, the method returns to step 302 to continue the search.

Returning to step 304, if the strength level (e.g., power level) of the signal received in the secondary receive channel is greater than the predetermined value, the secondary RSP would have already locked to a certain bandwidth as the actual signal strength can only be determined with the appropriate bandwidth of the signal (step 306). By assessing the bandwidth (and/or frequency) of the higher strength signal, the secondary RSP may determine the probable mode associated with the higher signal strength. Note that, in certain cases, the secondary RSP may be able to determine the probable mode of the higher strength signal solely from the frequency of that signal.

If (at step 306) the secondary RSP determines that the bandwidth of the signal received in the secondary receive channel has a level that is substantially equal to the predetermined value, that RSP can lock up the programming of the components in that receive channel in order to continue to receive the signals at that frequency and in that mode (step 308). The secondary RSP then sends a suitable message (e.g., via control line 143) to the DSP (e.g., DSP 145) in the transceiver's modem (e.g., modem 142), which informs that DSP about the probable identity of the mode associated with the signals in the secondary receive channel (step 310). The transceiver's modem adopts that mode (step 312).

Next, the modem's DSP determines if a pilot signal (e.g., reference signal) and/or page signal from a BS have been received via the secondary receive channel (step 314). If not, the method returns to step 302 to continue the search. If a pilot signal and/or page signal have been received, the DSP of the transceiver's modem can use one or both of those signals to confirm the mode associated with the signals being received in the secondary receive channel (step 316). The DSP of the transceiver's modem determines that the new configuration of the programmable secondary receive channel is set (step 318), and the secondary receive channel is prepared to await any signals including over-the-air programming or tasking that may be conveyed from that BS (step 320). At this stage, the modem 142 may set-up the transmitter 104 to send an acknowledgement to the Base Station to initiate over-the-air tasks or programming.

Figure 4:
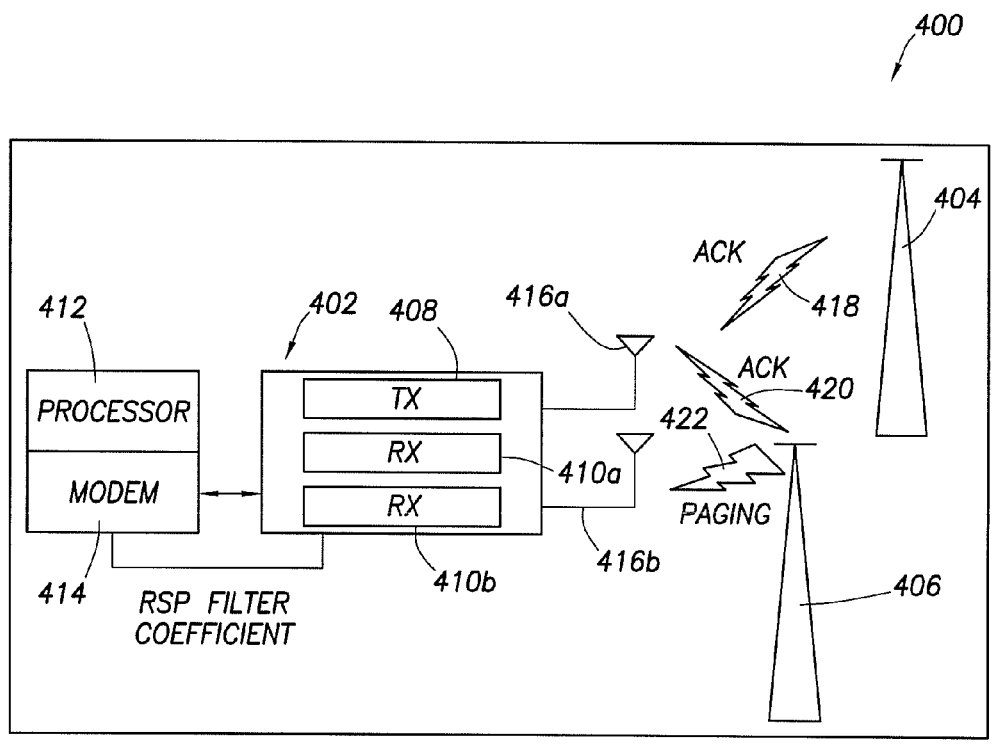
FIG. 4 is a simplified block diagram depicting a wireless communication system, which illustrates how the wireless transceiver shown in FIG. 1 can readily facilitate dynamic reconfiguration in order to perform over-the-air programming or tasks without disrupting on-going communications.

FIG. 4 is a simplified block diagram depicting a wireless communication system 400, which illustrates how wireless transceiver 100 in FIG. 1 can readily facilitate dynamic reconfiguration in order to perform over-the-air programming or tasks without disrupting on-going communications. For this illustrative example, system 400 includes a wireless transceiver generally designated by reference numeral 402. The wireless transceiver 402 includes a programmable transmitter section 408, two programmable receive channels 410a and 410b, a DSP 412, a modem 414, and two transmit/receive antennas 416a and 416b. For example, similar to wireless transceiver 100 in FIG. 1, the transmitter section 408 and two receive channels 410a, 410b can be located within an RFIC, and the DSP 412, modem 414 and antennas 416a, 416b can be located outside the RFIC. System 100 also includes two BS radio air interface antennas 404 and 406, which are capable of transmitting and receiving at different frequencies in different communication modes (e.g., WCDMA, CDMA, PCS, DCS, GSM, etc.). Example communications are indicated by the arrows labeled 418, 420 and 422.

For this example, it may be assumed that transmitter section 408 and receive channel 410a are primary components that are actively communicating with BS antenna 404 via antenna 416a in one mode (e.g., CDMA), as indicated by the acknowledgment message (ACK) 418. Also assume that receive channel 410b is a secondary receive channel, which has executed one or more suitable searches for a higher strength signal than that being detected and processed by the primary receive channel 410a, determined that the strength of the signal received from BS antenna 406 is greater than that of the predetermined value, locked up the configuration of the secondary receive channel, and has informed DSP 412 (and modem 414) about the probable communications mode of the higher strength signal. The modem 414 may program or set the configuration of the secondary receive channel by providing suitable filter coefficients for the digital channel filter located in the secondary RSP. In response to suitable instructions from the secondary RSP, the DSP 412 adopts the mode for the higher strength signal, and attempts to confirm the identity of that mode. The modem 414 can use a pilot signal and/or a paging signal 422 received via the secondary receive channel to confirm the mode. The DSP 412 causes the wireless transceiver 402 to send a suitable acknowledgment (ACK) message 420 to BS antenna 406 via antenna 416a. The secondary receive channel is then prepared to receive suitable signals in order to execute over-the-air programming or tasking for the BS associated with antenna 406, without having disrupted the ongoing communications between the primary receive channel and BS antenna 404.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A reconfigurable wireless transceiver, comprising:
a first receiver unit coupled to a first antenna and operable to receive over the first antenna a first signal in a first communication mode from a first base station antenna;
a second receiver unit coupled to a second antenna and operable to search a plurality of communication modes for a second signal from a second base station antenna received over the second antenna, detect the second signal, and determine a strength level and communication mode of the detected second signal;
a transmitter unit coupled to the first antenna and operable to send an acknowledgement message to the second base station antenna over the first antenna in response to the reception and detection of the second signal received over the second antenna; and
a processing unit coupled to the first and second receiver units and the transmitter unit, the processing unit operable to determine if the strength level of the detected second signal is greater than a first predetermined value, and, while the first receiver unit receives the first signal, enable the second receiver unit to receive a third signal from the second base station antenna in the communication mode of the detected second signal if the strength level of the detected second signal is greater than the first predetermined value and if a bandwidth of the detected second signal is greater than a second predetermined value, the third signal comprising data associated with over-the-air programming to reconfigure the wireless transceiver;
wherein the first and second receiver units and the transmitter unit are disposed within a radio frequency integrated circuit (RFIC) and the first and second antennas and the processing unit are disposed outside of the RFIC, and
wherein the first communication mode is different than the communication mode of the detected second signal.

2. The reconfigurable wireless transceiver of claim 1, wherein the first predetermined value is substantially equal to a strength level of the first signal.

3. The reconfigurable wireless transceiver of claim 1, wherein the processing unit is disposed in a wireless transceiver modem disposed outside of the RFIC.

4. The reconfigurable wireless transceiver of claim 1, wherein the processing unit comprises at least one Radio Signal Processor.

5. The reconfigurable wireless transceiver of claim 1, wherein the processing unit is further operable to adopt the second communication mode associated with the detected second signal.

6. The reconfigurable wireless transceiver of claim 1, further comprising:
a first radio signal processor associated with the first receiver unit;
a first receive signal strength indicator unit operable to indicate the signal strength of the first signal, coupled to the first radio signal processor;
a second radio signal processor associated with the second receiver unit; and
a second receive signal strength indicator unit operable to indicate the signal strength of the detected second signal, coupled to the second radio signal processor.

7. The reconfigurable wireless transceiver of claim 1, wherein the first and second receiver units are programmable receivers.

8. The reconfigurable wireless transceiver of claim 1, wherein wireless transceiver applications comprise at least one of a cellular phone, mobile radiotelephone, wireless handset, and mobile station.

9. The reconfigurable wireless transceiver of claim 1, wherein the first communication mode and the communication mode of the detected second signal are each one of: WCDMA, WiMax, CDMA, GSM, DCS, and PCS.

10. A reconfigurable receiver for a wireless transceiver, comprising:
a first programmable receive channel coupled to a first antenna;
a first signal strength indicator coupled to the first programmable receive channel;
a second programmable receive channel coupled to a second antenna;
a second signal strength indicator coupled to the second programmable receive channel;
a transmit channel coupled to the first antenna; and
a digital processing unit coupled to the first programmable receive channel, first signal strength indicator, second programmable receive channel, and second signal strength indicator, wherein the digital processing unit is adapted to:
program the first programmable receive channel to receive over the first antenna a first signal in a first communication mode from a first base station antenna;
program the second programmable channel to search a plurality of communication modes for a second signal from a second base station antenna received over the second antenna, detect the second signal, and determine a communication mode of the detected second signal;
receive from the first signal strength indicator, a first value associated with a signal strength of the received first signal;
receive from the second signal strength indicator, a second value associated with a signal strength of the detected second signal;
compare the second value with a first predetermined value;
if the second value is greater than the first predetermined value and if a bandwidth of the detected second signal is greater than a second predetermined value, program the second programmable receive channel to receive a third signal from the second base station antenna in the communication mode of the detected second signal while the first programmable receive channel receives the first signal, the third signal comprising data associated with over-the-air programming to reconfigure the wireless transceiver; and
program the transmit channel to send an acknowledgement message to the second base station antenna over the first antenna in response to the reception and detection of the second signal received over the second antenna;
wherein the first and second receiver units and the transmitter unit are disposed within a radio frequency integrated circuit (RFIC) and the first and second antennas and the digital processing unit are disposed outside of the RFIC, and
wherein the first communication mode is different than the communication mode of the detected second signal.

11. The reconfigurable receiver of claim 10, wherein the digital processing unit comprises a Digital Signal Processor disposed in a wireless transceiver modem.

12. The reconfigurable receiver of claim 10, wherein the first programmable receive channel includes a first radio signal processor, and the second programmable receive channel includes a second radio signal processor.

13. The reconfigurable receiver of claim 10, wherein the first predetermined value is substantially equal to the signal strength of the received first signal.

14. The reconfigurable receiver of claim 10, wherein the digital processing unit comprises at least one Radio Signal Processor.

15. The reconfigurable receiver of claim 10, wherein the digital processing unit is disposed in a wireless transceiver modem disposed outside of the RFIC.

16. A method for reconfiguring a wireless transceiver, comprising:
   receiving, at a first receiver unit coupled to a first antenna, a first signal in a first communication mode from a first base station antenna;
   searching, at a second receiver unit coupled to a second antenna, a plurality of communication modes for a second signal from a second base station antenna;
   detecting, at the second receiver unit, the second signal;
   determining, at the second receiver unit, a signal strength and communication mode of the detected second signal;
   comparing, at a processing unit coupled to the first and second receiver units, the signal strength of the received second signal with a first predetermined signal strength value;
   while receiving the first signal at the first receiver unit, enabling reception of the detected second signal, if the signal strength of the detected second signal is greater than the first predetermined signal strength value and if a bandwidth of the detected second signal is greater than a second predetermined value, the detected second signal comprising data associated with over-the-air programming to reconfigure the wireless transceiver; and
   transmitting, by a transmitter unit coupled to the first antenna, an acknowledgement message to the second base station antenna over the first antenna in response to the searching and detecting of the second signal received over the second antenna;
   wherein the first and second receiver units and the transmitter unit are disposed within a radio frequency integrated circuit (RFIC) and the first and second antennas and the processing unit are disposed outside of the RFIC, and
   wherein the first communication mode is different than the communication mode of the detected second signal.

17. The method of claim 16, wherein the first predetermined signal strength value is substantially equal to a signal strength of the received first signal.

18. The method of claim 16, further comprising:
   determining if the bandwidth of the detected second signal is greater than the second predetermined value; and
   determining a communication protocol associated with the detected second signal.

19. The method of claim 16, wherein the first communication mode and the second communication mode are each one of: WCDMA, WiMax, CDMA, GSM, DCS, and PCS.

20. The method of claim 16, further comprising:
   determining an identity of the communication mode of the detected second signal;
   receiving a reference signal associated with the detected second signal; and
   confirming the identity of the communication mode of the detected second signal using information included in the reference signal.

21. The method of claim 20, wherein the reference signal comprises a pilot signal.

22. The reconfigurable receiver of claim 12, wherein the first programmable receive channel is configured to receive RF signals from a plurality of frequency bands, the first programmable receive channel further comprising:
   a plurality of low noise amplifiers (LNAs), each LNA associated with one of the frequency bands;
   a multiplexer coupled to a down-converter and configured to select signals received in the plurality of frequency bands from the LNAs by transmitting the signals to the down-converter, the down-converter configured to convert each selected RF signal to a baseband signal;
   a first programmable low-pass filter configured to receive the baseband signal from the down-converter and reduce interference in the baseband signal;
   a variable gain amplifier configured to receive the filtered baseband signal, amplify the filtered baseband signal, and transmit the baseband signal to a second programmable low-pass filter; and
   an analog-to-digital converter configured to receive the baseband signal from the second programmable low-pass filter, convert the baseband signal to a digital signal, and transmit the digital signal to the first radio signal processor.

* * * * *